US011389740B2

(12) United States Patent
Casino et al.

(10) Patent No.: US 11,389,740 B2
(45) Date of Patent: Jul. 19, 2022

(54) TOY SYSTEM WITH EXTRUDER

(71) Applicants: Bang Zoom Design, Ltd., Cincinnati, OH (US); Hasbro, Inc., Pawtucket, RI (US)

(72) Inventors: Steven Casino, Ft. Thomas, KY (US); Michael G. Hoeting, Cincinnati, OH (US)

(73) Assignee: Bang Zoom Design, Ltd., Cincinnati, OH (US)

( * ) Notice: Subject to any disclaimer, the term of this patent is extended or adjusted under 35 U.S.C. 154(b) by 121 days.

(21) Appl. No.: 16/696,151

(22) Filed: Nov. 26, 2019

(65) Prior Publication Data

US 2020/0197827 A1 Jun. 25, 2020

Related U.S. Application Data

(60) Provisional application No. 62/771,906, filed on Nov. 27, 2018.

(51) Int. Cl.
*A63H 33/00* (2006.01)
*B29C 48/475* (2019.01)

(52) U.S. Cl.
CPC .......... *A63H 33/001* (2013.01); *B29C 48/475* (2019.02)

(58) Field of Classification Search
CPC ...... B29C 48/02; B29C 48/475; A63H 33/001
See application file for complete search history.

(56) References Cited

U.S. PATENT DOCUMENTS

| 3,157,933 | A | * | 11/1964 | Boggild | ............... | A63H 33/001 |
| | | | | | | 425/190 |
| 3,685,936 | A | | 8/1972 | Meth et al. | | |
| 3,892,510 | A | | 7/1975 | Meth et al. | | |
| 4,518,367 | A | | 5/1985 | Zaruba et al. | | |
| 4,623,319 | A | * | 11/1986 | Zaruba | ..................... | A63H 3/06 |
| | | | | | | 425/190 |
| 5,297,980 | A | * | 3/1994 | Barthold | ................. | A63H 33/00 |
| | | | | | | 222/78 |
| 5,324,185 | A | | 6/1994 | Backus et al. | | |
| 6,602,066 | B1 | | 8/2003 | Heayes | | |
| 7,275,924 | B1 | * | 10/2007 | Kreuzer | ............... | B29C 48/475 |
| | | | | | | 425/169 |

(Continued)

OTHER PUBLICATIONS

"Smart Kitchen: With making soba machine side comfort how to make DVD," available at global.rakuten.com/en/store/smartkitchen/item/10003268/, last visited Nov. 20, 2019.

(Continued)

*Primary Examiner* — Galen H Hauth
(74) *Attorney, Agent, or Firm* — DiBerardino McGovern IP Group LLC

(57) ABSTRACT

A toy system includes: a toy body including an interface; an extrusion tube including a sidewall that defines an open interior region, the sidewall extends from a first end to a second end, at least one of the first end and the second end is configured to attach to the interface, and the sidewall defines extrusion features that pass through the sidewall; and a plunger configured to move in the interior region and to force a moldable material in the interior region through the extrusion features to form an extruded moldable material.

22 Claims, 6 Drawing Sheets

(56) References Cited

U.S. PATENT DOCUMENTS

| 7,390,118 | B2 | | 6/2008 | MacDonald et al. |
| 2001/0041196 | A1 | * | 11/2001 | Yamane ............... A63H 33/001 |
| | | | | 425/116 |

OTHER PUBLICATIONS

"Daily 70s Spot: Play-Doh Fuzzy Pumper Barber & Beauty Shop (1978)," available at https://www.bionicdisco.com/2013/03/12/daily-70s-spot-play-doh-fuzzy-bumper-barber-beauty-shop-1978/, last visited Mar. 4, 2020.

* cited by examiner

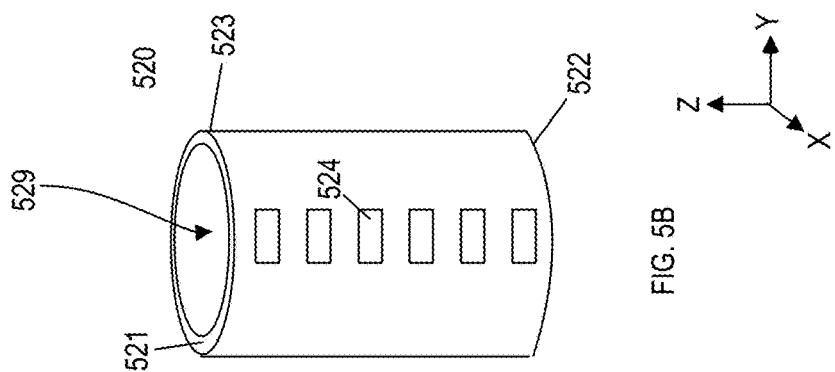
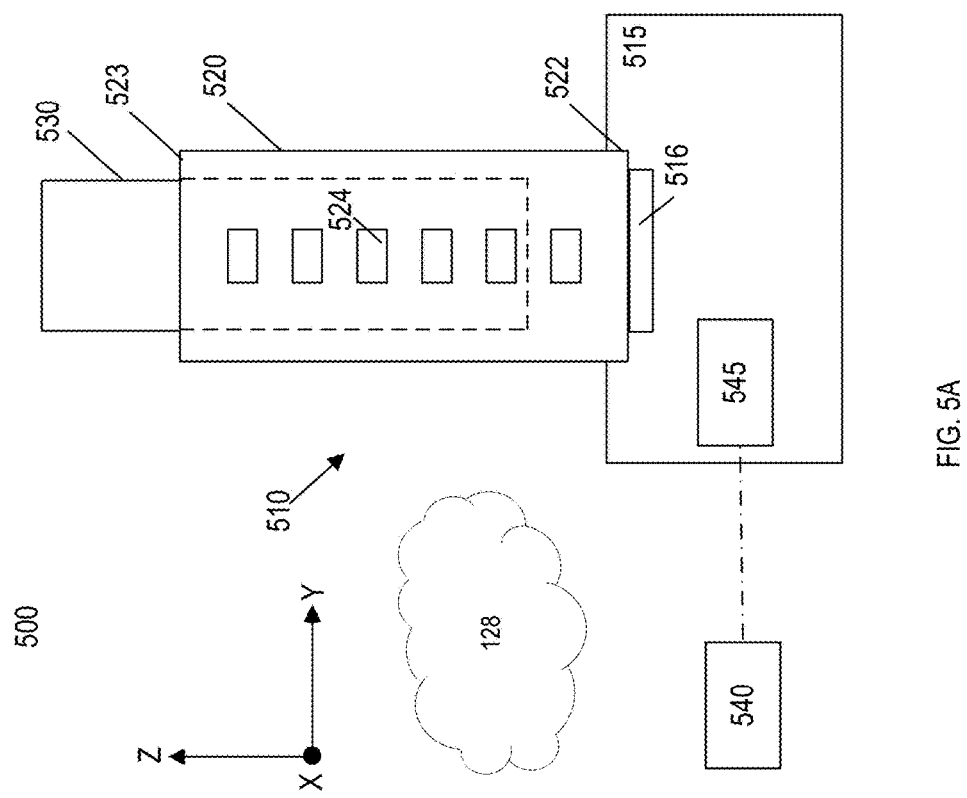

TOY SYSTEM WITH EXTRUDER

CROSS-REFERENCE TO RELATED APPLICATION

This application claims the benefit of U.S. Provisional Application No. 62/711,906, filed on Nov. 27, 2018 and titled TOY SYSTEM WITH EXTRUDER, which is incorporated herein by reference in its entirety.

TECHNICAL FIELD

This disclosure relates to a toy system with extruder.

BACKGROUND

Persons of all ages enjoy playing and interacting with toys and building elements.

SUMMARY

In one general aspect, a toy system includes: a toy body including an interface; an extrusion body including a sidewall that defines an open interior region, the sidewall extends from a first end to a second end, at least one of the first end and the second end is configured to attach to the interface, and the sidewall defines extrusion features that pass through the sidewall; and a plunger configured to move in the interior region and to force a moldable material in the interior region through the extrusion features to form an extruded moldable material.

Implementations may include one or more of the following features.

The moldable material may pass through the extrusion features along a direction that is substantially perpendicular to a direction of motion of the plunger.

The extrusion features may be slot-shaped.

The toy system also may include a control system coupled to an output device on the toy body.

The toy body may include a door that is configured to open when the plunger is inserted into the extrusion body.

The second end of the extrusion body is impermeable to the moldable material.

The extrusion body may be an extrusion tube. The extrusion tube may be cylindrical.

The moldable material may be a clay or a dough.

In another general aspect, a method of extruding a moldable material in a toy system includes: placing a moldable material in an interior of an extrusion body, the extrusion body being part of a toy system; inserting a plunger into the interior of the extrusion body; and applying pressure to the plunger until the plunger presses against the moldable material to force the moldable material through at least one extrusion feature in a sidewall of the extrusion body. The moldable material that is forced through the at least one extrusion feature is an extruded moldable material.

Implementations may include one or more of the following features.

The moldable material may be forced through the at least one extrusion feature in a direction that is substantially perpendicular to a direction of the applied pressure.

The extruded moldable material may remain on the exterior of the extrusion body to thereby decorate the exterior of the extrusion body. In some implementations, the method also includes removing at least some of the extruded moldable material from the exterior of the extrusion body. The removed extruded moldable material may be placed on a separate object.

Applying pressure to the plunger until the plunger presses against the moldable material may press the moldable material against a barrier that is impermeable to the moldable material.

The first end may be an open end. The second end may be an open end. The first end and the second end may be open ends.

In another general aspect, a toy system includes: a moldable material; a toy body that includes an interface; an extrusion body including a sidewall that defines an open interior region, wherein the sidewall extends from a first end to a second end, at least one of the first end and the second end is configured to attach to the interface, and the sidewall defines extrusion features that pass through the sidewall; and a plunger configured to move in the interior region and to force the moldable material in the interior region through the extrusion features to form an extruded moldable material.

Implementations may include one or more of the following features. The toy system also may include one or more accessories configured to interact with the extruded moldable material. The first end may be an open end. The second end may be an open end. The first end and the second end may be open ends.

Implementations of any of the techniques described above may include a toy system, a method, a device, a toy, an piece of extruded moldable material, or an extruded moldable material that is capable of being used as decoration for a separate object. The details of one or more implementations are set forth in the accompanying drawings and the description below. Other features will be apparent from the description and drawings, and from the claims.

DRAWING DESCRIPTION

FIG. 5A is a block diagram of another example of a toy system.

FIG. 5B is a perspective view of an extrusion body that may be used with the toy system of FIG. 5A.

DETAILED DESCRIPTION

Figure 1:
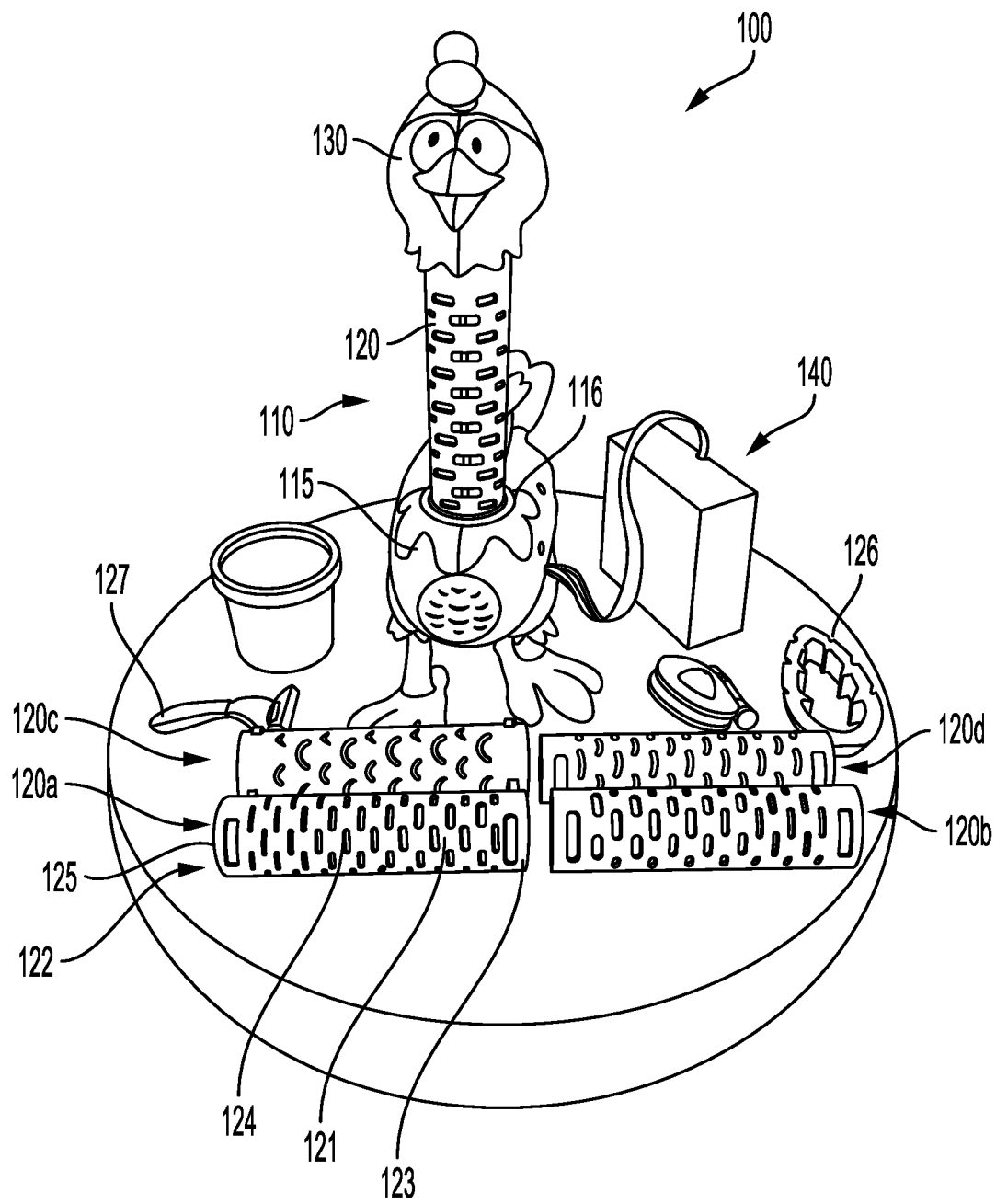
FIG. 1 is a perspective view of an example of a toy system.

Referring to FIG. 1, a perspective view of a toy system 100 is shown. The toy system 100 is an example of a toy system with an extruder. The toy system 100 includes a figurine 110. In the example discussed herein, the figurine 110 has the appearance of a chicken. However, the figurine 110 may resemble other entities, such as, for example, animals with relatively long necks other than chickens, other animals, plants, Christmas trees, fictional characters, or whimsical items. The figurine 110 includes a toy body 115, an extrusion tube 120 extending from the toy body 115, and a plunger 130.

In addition to the extrusion tube 120, the toy system 100 includes extrusion tubes 120a-120d. The extrusion tube 120 may be removed from the toy body 115 and replaced with any of the extrusion tubes 120a-120d. The extrusion tubes 120 and 120a-120d are similar. For simplicity, only the extrusion tube 120a is discussed in detail.

The extrusion tube 120a is a cylindrical body formed by a sidewall 121 that extends along a longitudinal axis from a first end 122 to a second end 123. The extrusion tube 120a is open at the first end 122 and the second end 123. Extrusion features 124 are formed in the sidewall 121. The extrusion features 124 are openings that pass all the way through the sidewall 121. In other words, the extrusion features 124 allow air and other substances to pass from the interior of the extrusion tube 120a to the exterior of the extrusion tube 120a. The extrusion tube 120a also includes flanges 125 at the ends 122 and 123. The flanges 125 allow the extrusion tube 120a to be attached and removed from the toy body 115 at an interface 116.

The extrusion features 124 are openings with a perimeter that is shaped like rectangular slots with rounded corners. The extrusion features 124 are not all the same size on the extrusion tube 120a. Instead, the extrusion features 124 are larger near the end 123 than those at the end 122. In other implementations (for example, the extrusion tube 120c), all of the extrusion features are the same size. The extrusion features 124 may have other shapes. For example, the extrusion features 124 may be openings that have a perimeter shaped like half-moons, crescents, rectangular slots, squares, or diamonds. The features 124 may be arranged in a pattern that is repeating and regular, or the features 124 may be arranged in a random manner. The features 124 may be arranged in columns with the features in a particular column being staggered along the longitudinal axis relative to features in other columns. Moreover, although the extrusion tube is open at the ends 122 and 123, these openings are distinct from the extrusion features 124. As discussed below, the extrusion features 124 are configured to extrude and shape a moldable material 128 (FIG. 4) and to allow the moldable material 128 to pass from the interior of the extrusion tube 120a to the exterior of the extrusion tube 120a. The moldable material 128 is any pliable and shapeable material that is capable of being extruded. The moldable material 128 may be, for example, putty, clay, and/or a dough substance (for example, PLAY-DOH®, available from Hasbro, Inc. of Pawtucket, R.I.).

Figure 4:
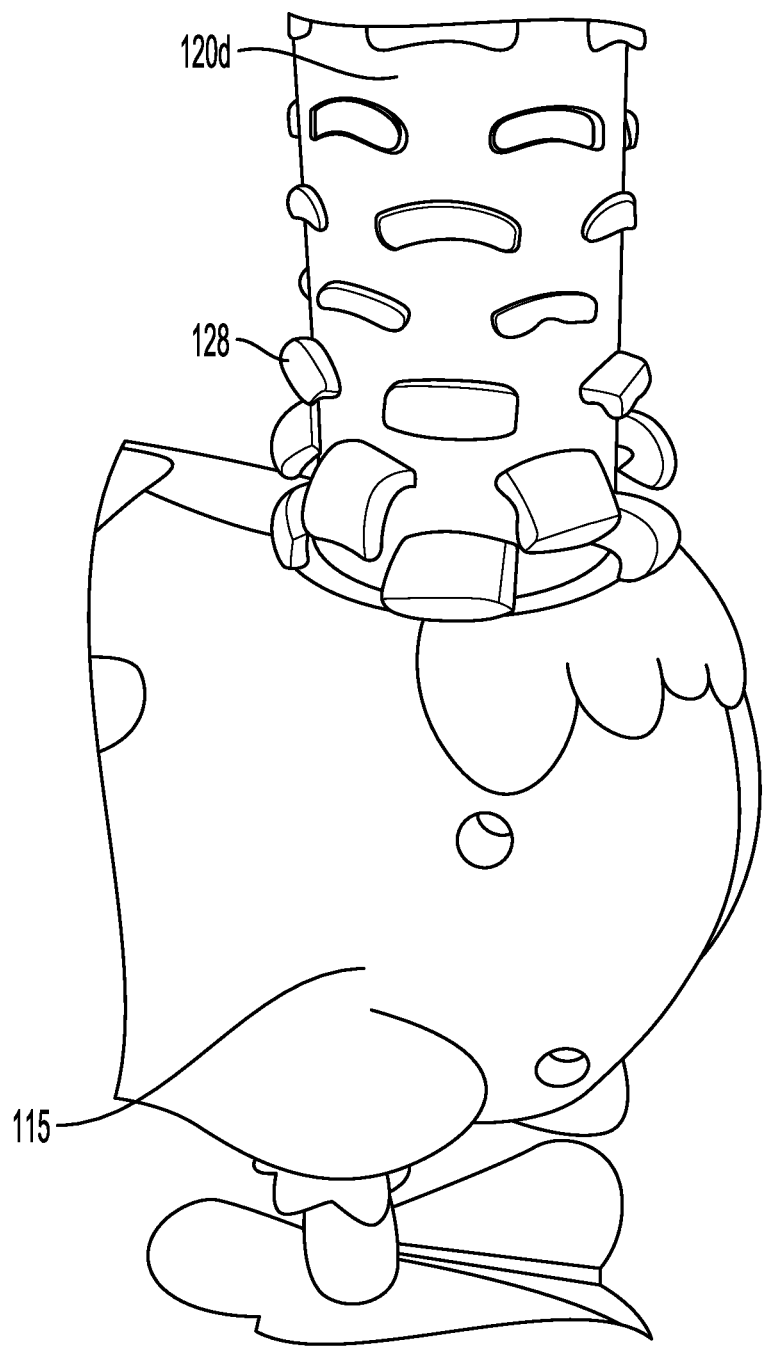
FIG. 4 shows an extrusion tube and toy body of the toy system of FIG. 1 with an extruded moldable material at an exterior of the extrusion tube.

The ends 122 and 123 may receive the moldable material 128 from the exterior of the tube 120a but are not configured to extrude the moldable material 128 from the interior to the exterior of the tube 120a. FIG. 4 shows the extrusion tube 120 and the toy body 115 at a time when the moldable material 128 is being extruded by being forced from the interior of the tube 120d to the exterior of the tube 120d through the extrusion features 124 (which are openings each of which has a perimeter shaped as a crescent in this example).

Referring again to FIG. 1, the extrusion tube 120 has a length that is defined by the extent of the sidewall 121 along a straight line from the end 122 to the end 123. As the length of the extrusion tube 120 increases, more force may need to be applied to the handle 134 to urge the shaft 132 into the tube 120 and force the moldable material 128 through the extrusion features 124. Additionally, the amount of force that needs to be applied to the handle 134 to extrude the moldable material 128 decreases as the diameter of the extrusion tube 120 increases. Furthermore, an implementation in which the extrusion features 124 have a more complex design (for example, the perimeter of the features 124 includes segments that are joined at angles, such as a star shape) may require more force be applied to the handle 134 as compared to an implementation that includes extrusion features having simpler perimeter shapes. Further, in implementations in which the perimeter of the extrusion features 124 include angles (as opposed to curves), the surface of the extruded moldable material may include small tears. The tears may provide a visual enhancement to the extruded moldable material. For example, in the example of FIG. 1, the extruded moldable material adds visual interest to the chicken's neck, and the tears may accentuate the feather look.

The extrusion tubes 120 and 120b-120d are the same as the extrusion tube 120a except each of the extrusion tubes 120 and 120b-120d have extrusion features that are different from the features 124. For example, the extrusion tube 120 has extrusion features that are shaped like rectangular slots. In the discussion below, the element numbers used to introduce the extrusion tube 120a are used to discuss the extrusion tube 120.

The toy system 100 also may include accessories to enhance game play and flexibility. For example, the toy system 100 includes a shape cutter 126 and a material remover 127. The shape cutter 126 is configured to cut a flattened piece of the moldable material 128 into the shape of the shape cutter 126. The material remover 127 is configured to allow a user of the system 100 to remove extruded moldable material from an exterior of the extrusion tube 120. In the example of FIG. 1, the material remover 127 is shaped like a disposable razor, but other forms may be used.

Figure 2:
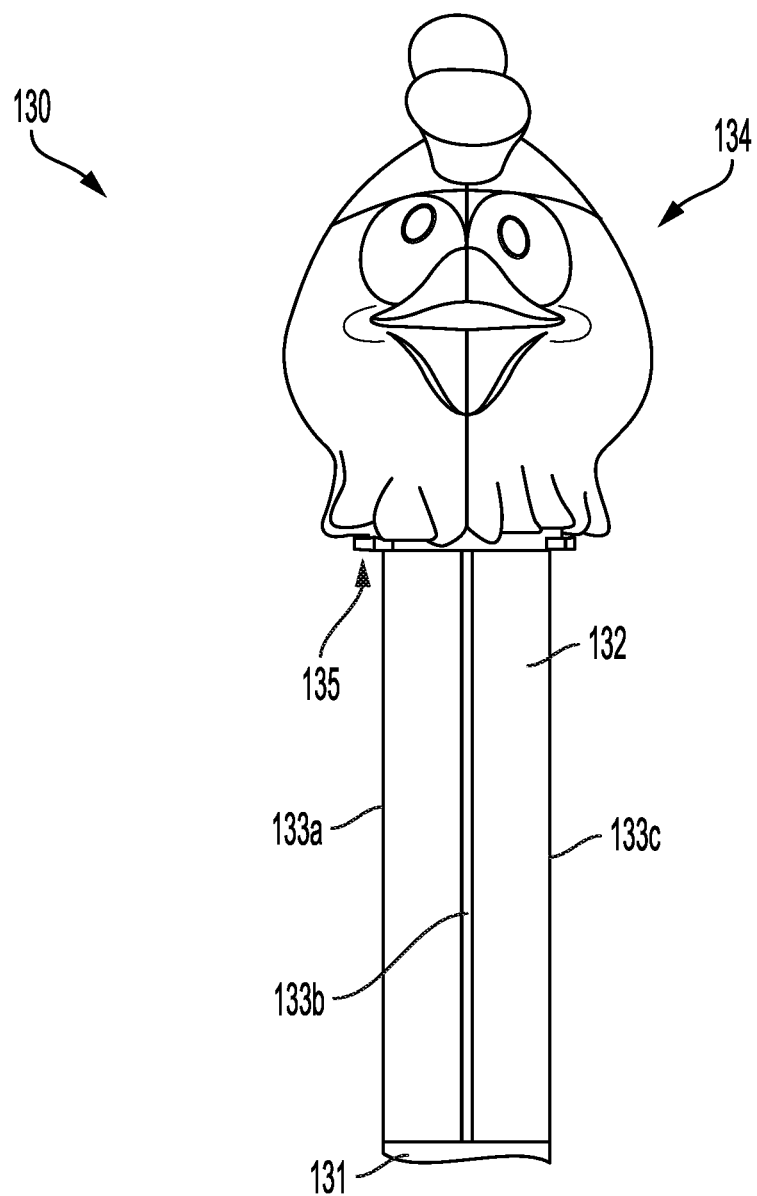
FIG. 2 is a side view of an example of a plunger that may be used in the toy system of FIG. 1.

Referring also to FIG. 2, which is a side view of the plunger 130, the plunger 130 includes a shaft 132 and a handle 134 at an end 135 of the shaft 132. The shaft 132 includes four rib members that extend along the longitudinal axis from the end 135 to an end 131. In FIG. 2, three rib members 133a, 133b, 133c are shown. The shaft 132 is placed in the extrusion tube 120 and slides along the longitudinal axis of the sidewall 121. The handle 134 has a larger diameter than the extrusion tube 120. When the shaft 132 is fully inserted into the extrusion tube 120, the handle rests at the end of the extrusion tube 120 that is not connected at the interface 116. The plunger 130 may be designed in other ways than the example shown in FIG. 2. For example, the plunger may be made with more or fewer or no ribs.

In operational use, the user attaches the extrusion tube 120 to the toy body 115 at the interface 116. While the plunger 130 is not coupled to the extrusion tube, the user places the molding material 128 in the interior of the extrusion tube 120. The user then inserts the shaft 132 into the interior of the extrusion tube 120. The user manipulates the handle 134 to urge the shaft 132 into the extrusion tube 120 along a direction that is substantially parallel to the longitudinal axis of the tube 120. Although the extrusion tube 120 is open at the ends 122 and 123, the interface 116 includes a wall 117 (FIG. 3) that is perpendicular to the longitudinal axis of the extrusion tube 120. Thus, the moldable material 128 cannot leave the tube 120 via the interface 116. Accordingly, the force of the shaft 132 forces the material out through the features 124. The molding material 128 is thereby extruded in a direction that is substantially perpendicular to the longitudinal axis and the direction of travel of the shaft. The shape of the extruded moldable material depends on the shape of the features 124.

The toy system 100 also includes a control pack 140 that is electrically connected to a perceivable output mechanism 145 in the toy body 115. The control pack 140 includes an energy source (such as a battery), an electronic processor, and an electronic memory. The perceivable output mechanism 145 may be, for example, a speaker and/or a light emitting device such as a light emitting diode (LED). The perceivable output mechanism 145 may include more than one device and may include different types of devices. The control pack 140 may cause the speaker 145 to play a sound when a force is applied to the wall 117 at the interface 116. When the moldable material 128 is in the extrusion tube 120, the moldable material 128 applies force to the wall 117 in response to the end 131 of the shaft 132 pressing against the moldable material 128. Thus, sounds play as the shaft 132 moves in the extrusion tube 120 toward the wall 117. When no moldable material 128 is in the extrusion tube 120, sounds are produced when the plunger 130 is fully inserted into the extrusion tube 120 and the end 131 of the shaft 132 applies force to the wall 117. In some implementations, the control pack 140 stores a plurality of sounds and selects one to play each time the plunger 130 is fully inserted into the extrusion tube 120.

Figure 3:
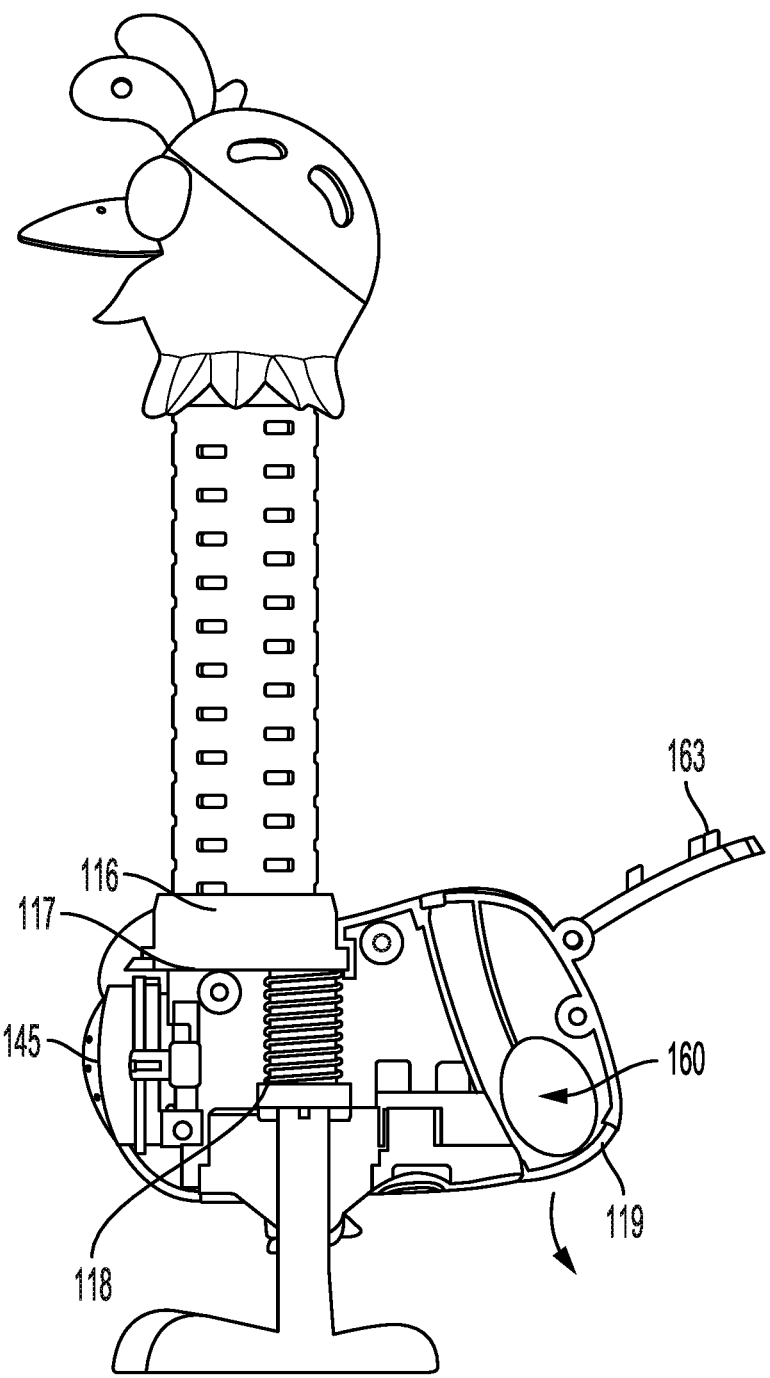
FIG. 3 is a side cross-section of a toy body of the toy system of FIG. 1.

Referring also to FIG. 3, a side cross-sectional view of the toy body 115 is shown. When the shaft 132 meets the interface 116, a spring 118 is compressed and a hinged door 119 opens. When the door 119 opens, a surprise or reward item 160 pops out. The surprise item 160 is placed in the interior of the toy body 115 via a hinged door 163. In the example of FIG. 3, the surprise item 160 is an egg. However, the surprise item 160 may take other forms. In the example discussed above, the extruded moldable material forms decorative feathers for the chicken's neck. In other implementations, the extruded moldable material forms other decorative items.

FIG. 5A is a side block diagram of a toy system 500. The toy system 500 is shown in the Y-Z plane but is a three-dimensional object. The toy system 500 is an example of a toy system with an extruder. The toy system 500 includes a toy body 515 and an extrusion body 520 that is physically connected to the toy body 515 at an interface 516 on the toy body 515. A perspective view of the extrusion body 520 is shown in FIG. 5B.

The extrusion body 520 includes a sidewall 521 that extends in the Z direction from a first end 522 to a second end 523. In the example of FIG. 5A, the first end 522 is connected to the interface 516. In other implementations, the second end 523 is connected to the interface 516. The interface 516 has any form that allows the extrusion body 520 to connect to the toy body 515. The interface 516 may be, for example, an opening that has the same shape in the X-Y plane as the extrusion body 520 has in the X-Y plane, with the diameter of the interface 516 being slightly larger than the diameter of the extrusion body 520. In these implementations, the interface 516 holds the first end 522 with an interference fit. In another example, the interface 516 may include slots that hold corresponding tabs or flanges on the extrusion body 520.

The extrusion body 520 is hollow and has an interior 529 that is defined by the sidewall 521. The extrusion body 520 is open at the end 523, which is the end that is not connected to the interface 516. The extrusion body 520 includes extrusion features 524. The extrusion features 524 are openings or passages that pass through the sidewall 521. The extrusion features 524 may have any shape and may be arranged in any way on the sidewall 521. For example, the extrusion features 524 may be arranged in a repeating pattern or in a random manner. Moreover, the extrusion body 520 may include any number of extrusion features 524 that is greater than zero. For example, the extrusion body 520 may include one, ten, a hundred, or any number of extrusion features. In the example shown in FIGS. 5A and 5B, the extrusion body 520 is cylindrically shaped. However, the extrusion body 520 may have any shape. For example, the extrusion body 520 may have a rectangular cross-section in the X-Y plane.

The toy system 500 includes a plunger 530. The plunger 530 fits into the end 523 and moves in the Z and –Z direction in the interior 529. The toy body 515 may be hollow or solid. In implementations in which the toy body 515 is hollow, the plunger 530 and the moldable material 128 do not enter the toy body 515. For example, the interface 516 may include a physical barrier or wall that prevents the plunger from entering the toy body 515. The toy body 515 is shown as having a rectangular shape in the Y-Z plane, but may have any shape. The toy body 515 and the extrusion body 520 together may have an appearance that resembles an animal, such as a chicken or a giraffe, or an object such as a tree. The toy body 515 includes an output device 545 that is connected to a control device 540. The output device 545 may be, for example, a speaker configured to emit sound or a light configured to emit light. In the example shown in FIG. 5A, the output device 545 is connected to a controller 540. For example, the output device 545 may be connected to the controller 540 by an electrical cable.

Figure 6:
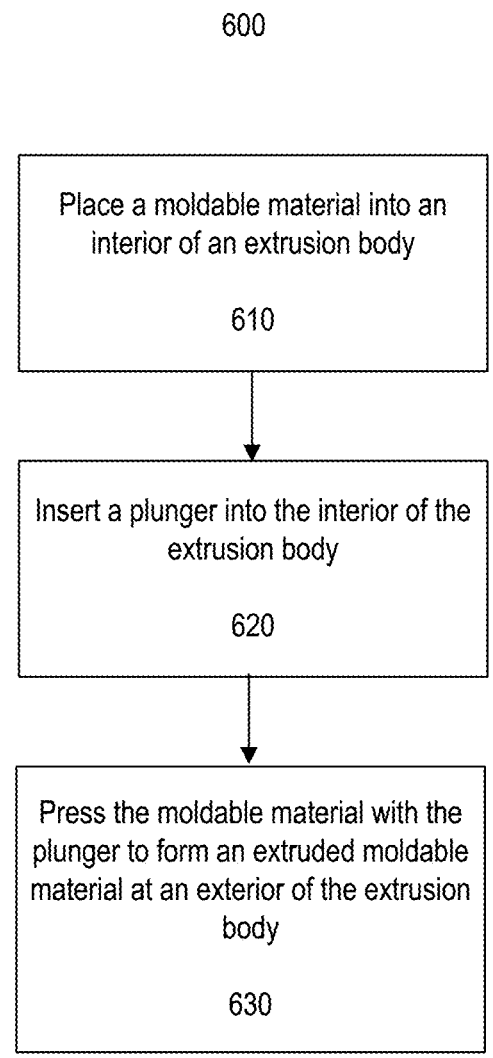
FIG. 6 is a flow chart of an example process for extruding a moldable material.

FIG. 6 is a flow chart of a process 600. The process 600 is an example of a process of using a toy system with an extruder. The process 600 may be used to, for example, decorate an exterior of a portion of the toy system with extruded pieces of a moldable material and/or to form an extruded moldable material. The process 600 is discussed with respect to the toy system 500 (FIGS. 5A and 5B). However, the process 600 also may be performed with the toy system 100.

The moldable material 128 is placed in the interior 529 of the extrusion body 520 (610). The plunger 530 is inserted into the opening at the second end 523 (620). The user applies pressure to the plunger in the –Z direction until the plunger 530 makes contact with the moldable material 128. The user continues to apply pressure to the plunger 530 in the –Z direction, and the moldable material 128 is pressed against a barrier at the end 523. The barrier is impermeable to the moldable material 128. The barrier may be, for example, a wall at the end 522 that closes the end 522. In another example, the barrier is a portion of the interface 516. Because the moldable material 128 cannot pass through the barrier, applying pressure to the moldable material 128 causes the moldable material 128 to pass through the extrusion features 524 to form an extruded moldable material at the exterior of the extrusion body 520 (630). The extruded moldable material may be left on the extrusion body 520 to form decoration on the extrusion body 520, or the extruded moldable material may be removed from the extrusion body 520 and used in other applications. For example, the removed extruded moldable material may be used as a decoration on another object.

These and other implementations are within the scope of the claims.

What is claimed is:

1. A toy system comprising:
a toy body comprising an interface;
an extrusion body comprising a sidewall that defines an open interior region, wherein the sidewall extends from a first end to a second end along an axis that follows a straight line, the second end is configured to attach to the interface, and the sidewall defines extrusion features that pass through the sidewall;

a wall at the second end, wherein the wall is perpendicular to the axis and is impenetrable to a moldable material; and a plunger configured to be inserted into the first end, to move in the interior region, and to press the moldable material against the wall to thereby force the moldable material in the interior region through the extrusion features to form an extruded moldable material.

2. The toy system of claim 1, wherein the moldable material passes through the extrusion features along a direction that is substantially perpendicular to a direction of motion of the plunger.

3. The toy system of claim 1, wherein the extrusion features are slot-shaped.

4. The toy system of claim 1, further comprising a control system coupled to an output device on the toy body.

5. The toy system of claim 1, wherein the plunger comprises a shaft and the toy body comprises a door that is configured to open when the shaft of the plunger meets the interface.

6. The toy system of claim 5, wherein the toy system further comprises a surprise in an interior of the toy body, and the surprise leaves the interior of the toy body when the door opens.

7. The toy system of claim 1, wherein the wall is the second end of the extrusion body.

8. The toy system of claim 1, wherein the extrusion body comprises an extrusion tube.

9. The toy system of claim 8, wherein the extrusion tube is cylindrical.

10. The toy system of claim 1, wherein the moldable material comprises a clay or a dough.

11. The toy system of claim 1, wherein the first end comprises a first open end, and the second end comprises a second open end.

12. The toy system of claim 11, wherein the wall is part of the interface.

13. A method comprising:
placing a moldable material in an interior of an extrusion body, the extrusion body being part of a toy system;
inserting a plunger into a first end of the interior of the extrusion body;
moving the plunger from the first end toward a wall at a second end of the extrusion body in a straight line along an axis of the extrusion body, the wall being perpendicular to the axis; and
applying pressure to the plunger such that the plunger presses against the moldable material to force the moldable material against the wall at the second end of the extrusion body to thereby force the moldable material through at least one extrusion feature in a sidewall of the extrusion body, wherein the moldable material that is forced through the at least one extrusion feature is an extruded moldable material.

14. The method of claim 13, wherein the moldable material is forced through the at least one extrusion feature in a direction that is substantially perpendicular to a direction of the applied pressure.

15. The method of claim 13, further comprising removing some of the extruded moldable material from the exterior of the extrusion body; and placing the removed extruded moldable material on a separate object.

16. The method of claim 13, wherein the extruded moldable material remains on the exterior of the extrusion body to thereby decorate the exterior of the extrusion body.

17. The method of claim 16, further comprising removing at least some of the extruded moldable material from the exterior of the extrusion body.

18. A toy system comprising:
a moldable material;
a toy body comprising an interface;
an extrusion body comprising a sidewall that defines an open interior region, wherein the sidewall extends from a first end to a second end along an axis that follows a straight line, the second end is configured to attach to the interface, and the sidewall defines extrusion features that pass through the sidewall;
a wall at the second end, wherein the wall is perpendicular to the axis and is impenetrable to a moldable material; and
a plunger configured to move in the interior region along the axis and to press the moldable material against the wall to thereby force the moldable material in the interior region through the extrusion features to form an extruded moldable material.

19. The toy system of claim 18, further comprising one or more accessories configured to interact with the extruded moldable material.

20. The toy system of claim 18, wherein the first end comprises a first open end, and the second end comprises a second open end.

21. The toy system of claim 20, wherein the wall is part of the interface.

22. The toy system of claim 18, wherein the wall is the second end of the extrusion body.

\* \* \* \* \*